United States Patent

[11] 3,615,174

| [72] | Inventor | William J. Lewis<br>South Ogden, Utah |
|---|---|---|
| [21] | Appl. No. | 740,886 |
| [22] | Filed | June 28, 1968 |
| [45] | Patented | Oct. 26, 1971 |
| [73] | Assignee | NL Industries, Inc.<br>New York, N.Y. |

[54] PROCESS FOR THE SELECTIVE RECOVERY OF POTASSIUM AND MAGNESIUM VALUES FROM AQUEOUS SALT SOLUTIONS CONTAINING THE SAME
11 Claims, 4 Drawing Figs.

[52] U.S. Cl. ..................................................... 23/38,
    209/11, 209/166, 23/91, 22/121
[51] Int. Cl. ..................................................... B03b 1/00,
    B03d 1/02, C01f 5/26
[50] Field of Search........................................... 209/166, 3,
    10, 11; 23/91, 38, 121

[56] References Cited
UNITED STATES PATENTS

| 2,479,001 | 8/1949 | Burke.............................. | 23/91 |
| 2,689,649 | 9/1954 | Atwood.......................... | 209/166 |
| 3,099,528 | 7/1963 | Hadzeriga ..................... | 23/91 X |
| 3,342,548 | 9/1967 | Macey............................. | 23/91 X |
| 3,432,031 | 3/1969 | Ferris............................. | 209/166 X |

FOREIGN PATENTS

| 1,075,166 | 4/1954 | France ........................... | 209/166 |

OTHER REFERENCES
Chem. Abst., Vol. 53, 1959, 9587e I & EC, Vol. 56, 7, Jy '64, 61 & 62.

Primary Examiner—Frank W. Lutter
Assistant Examiner—Robert Halper
Attorney—Ward, McElhannon, Brooks & Fitzpatrick ABSTRACT: Kainite immersed in brine in equilibrium converted to carnallite by cooling to about 10° C. or under. Carnallite so obtained purified by cold flotation. Purified carnallite water leached to yield magnesium chloride brine and potassium chloride salt. Latter optionally converted to potassium sulfate by reaction with kainite, or by reacting the carnallite with kainite. Naturally occurring brine concentrated to precipitate principally sodium chloride, mother liquor warm concentrated to precipitate kainite, cooled under mother liquor for conversion to carnallite. A crude kainite fraction purified by warm flotation and a crude carnallite fraction purified by cold flotation reacted together to yield magnesium chloride brine and potassium sulfate salt.

PROCESS FOR THE SELECTIVE RECOVERY OF POTASSIUM AND MAGNESIUM VALUES FROM AQUEOUS SALT SOLUTIONS CONTAINING THE SAME

This invention pertains to improvements in the selective recovery of potassium and magnesium values from aqueous salt solutions containing chloride and sulfate salts of sodium, potassium and magnesium.

The invention pertains more particularly to the recovery of such values from naturally occurring brines, such as salt lakes, bitterns, inland seas, etc. which are high in such metallic salt concentrations. Where such brines are so located that solar evaporation is available throughout a substantial portion of the year, it becomes economically feasible to process the same for recovery in particular of potassium salts for use as a fertilizer or soil enricher among others, and magnesium salts for use in the production of metallic magnesium by electrolysis.

Fractional crystallization by solar evaporation of brines similar in composition to those of the Great Salt Lake in Utah, yields first common salt, NaCl, and then a mixture of common salt with various complex double salts. Under most conditions of solar evaporation in warm or summertime environment, the crude complex harvest salts thus obtained will consist almost entirely of kainite salt, $MgSO_4 \cdot K_2SO_4 \cdot MgCl_2 \cdot 6H_2O$ or $MgSO_4 \cdot KCl \cdot 3H_2O$, admixed with common salt NaCl, from which latter the kainite slat may be separated and purified by flotation. Long chain fatty amine acetates or chlorides preferably of at least eight carbon atoms, may be employed as floating agents and aliphatic alcohols of at least five carbon atoms, such as pentasol, as frothing agents.

The purified kainite salt thus obtained as well as the mother liquor from which the crude salt is precipitated, may be processed by various techniques for selective recovery of the potassium and magnesium values. In all such processes of which I am aware, however, the starting point for recovery of the potassium values is the purified kainite salt the processing of which for separating the potassium and magnesium values thereof is inherently complex and expensive.

The present invention eliminates this difficulty by employment of several discoveries which I have made and which are unique and basically novel insofar as I am aware. The first of these discoveries is that kainite will convert to carnallite, $MgCl_2 \cdot KCl \cdot 6H_2O$, if cooled below about 10° C. (50° F.) under the mother liquor from which the kainite salt is precipitated. The second discovery is that crude carnallite salt may be refined or purified by flotation in a cold flotation circuit maintained below the above temperature.

By thus converting crude kainite salt to crude carnallite salt and purifying the crude carnallite salt in a cold flotation system, separation of the potassium and magnesium values is readily effected by simply leaching the carnallite salt with water to produce potassium chloride salt and magnesium chloride brine according to the reaction:

(1) $\frac{\text{Carnallite Salt}}{MgCl_2 \cdot KCl \cdot 6H_2O + H_2O} \longrightarrow \frac{\text{Salt}}{KCl} + \frac{\text{Brine}}{MgCl_2 + H_2O}$ which are separated by filtration.

For many applications the KCl salt thus obtained is not so desirable as the sulfate salt, which leads to my third discovery, namely, that kainite will react with carnallite to produce $K_2SO_4$ salt and $MgCl_2$ brine according to the reaction:

(2) $\frac{\text{Kainite}}{MgSO_4 \cdot KCl \cdot 3H_2O} + \frac{\text{Carnallite}}{MgCl_2 \cdot KCl \cdot 6H_2O + H_2O}$ $\downarrow$

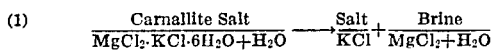

A variation of this comprises the reaction of the KCl salt obtained from carnallite as above with kainite salt according to the following reaction:

(3) 

Based on the above discoveries, the present invention employs basically the principles of fractional solar evaporation of naturally occurring brines for eliminating the bulk of sodium chloride and thence precipitating crude kainite salt upon further concentration, but differs basically at this stage from prior techniques, in that the kainite salt is not harvested as such, but is retained under the mother liquor from which it is precipitated and the mother liquor cooled thence to a sufficiently low temperature to convert the kainite salt into carnallite, which is harvested and purified by flotation in a cold system, i.e., at about 0° C. employing the flotation agents above discussed.

In the practical application of this basic process in temperate climates, such as that prevailing in the area of the Great Salt Lake, the lake brine is subjected to successive stages of solar evaporation during the warm summer months ultimately to precipitate kainite salt which is retained under the mother liquor until cold weather at sufficiently low temperature prevails to convert the kainite into carnallite. The mother liquor is thereupon withdrawn and the crude carnallite salt harvested and processed as above.

In accordance with a modification of the basic process some of the kainite salt is harvested and purified by flotation at warm temperature and stored. When the weather turns sufficiently cold to convert the remaining kainite into carnallite, the latter is harvested and purified in a cold flotation system. The purified kainite and carnallite values are then admixed and reacted in accordance with equation (2) above to produce $K_2SO_4$ salt and $MgCl_2$ brine.

The invention thus provides an extremely simple and economical process for selectively recovering potassium and magnesium values from naturally occurring brines wherein solar evaporation is relied on for concentrating the brine and ultimately precipitating crude kainite salt, and wherein naturally occurring temperature changes are relied upon for converting the crude kainite salt into crude carnallite salt, which requires upon flotation purification, only treatment with water for separation and recovery of the potassium and magnesium values.

The brine withdrawn from the carnallite or kainite precipitation stages is high in magnesium chloride and sulfate values, the magnesium sulfate content of which is converted by desulfation as with $CaCl_2$ into magnesium chloride. This combined with the $MgCl_2$ brine obtained from the reactions above discussed, is in accordance with the invention, concentrated sufficiently for spray drying and then converted into a dry $MgCl_2$ powder in this way for further processing as desired.

Having thus described the invention in general terms, reference will now be had to the accompanying drawings for a more detailed description of the above and other features, wherein,

FIG. 3 is a flow sheet in diagrammatic form of the basic process of the invention, while

Figure 1:
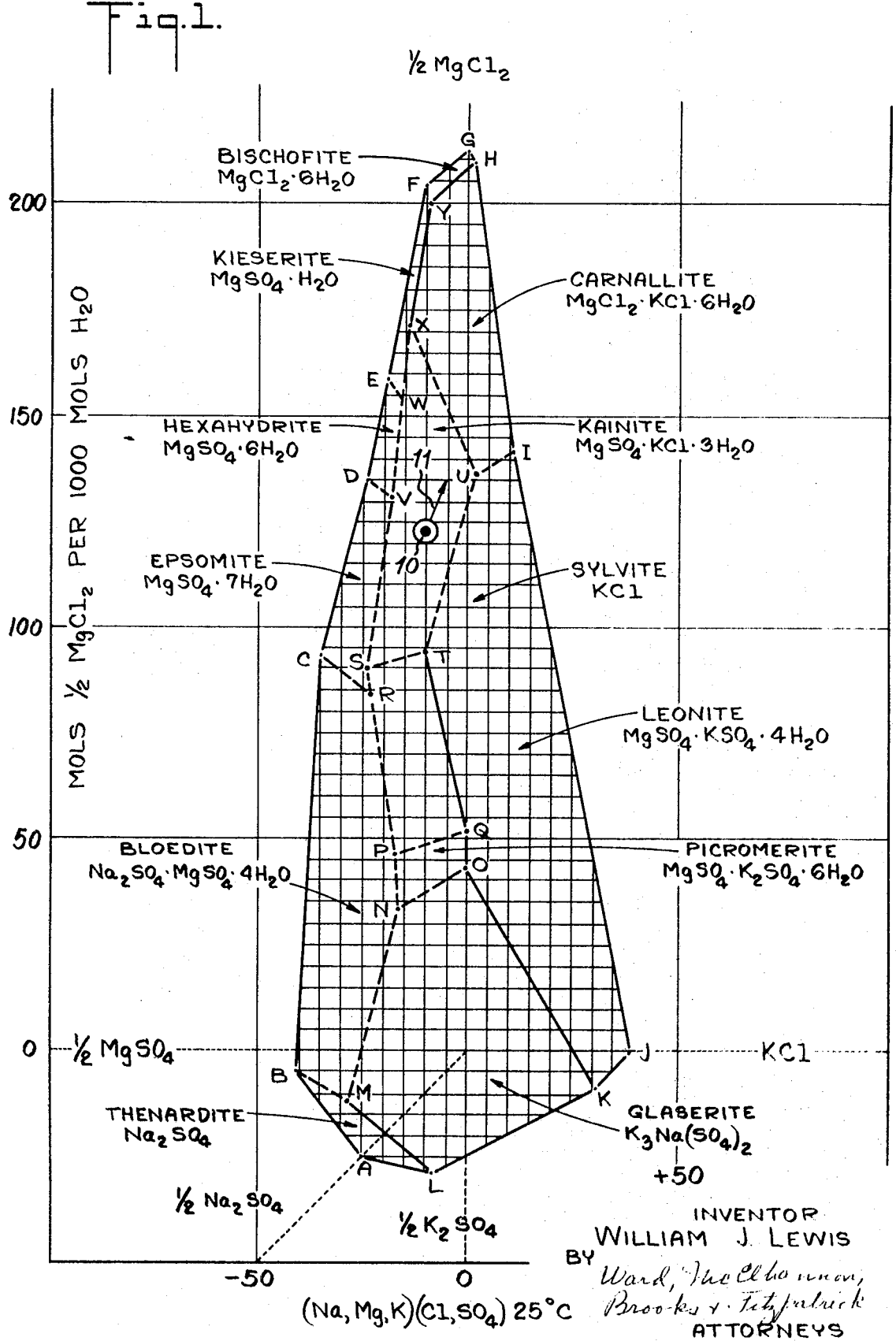
FIG. 1 is an equilibrium phase diagram of the (Na, Mg, K) (Cl, $SO_4$) salt solution system at 25° C.
Figure 2:
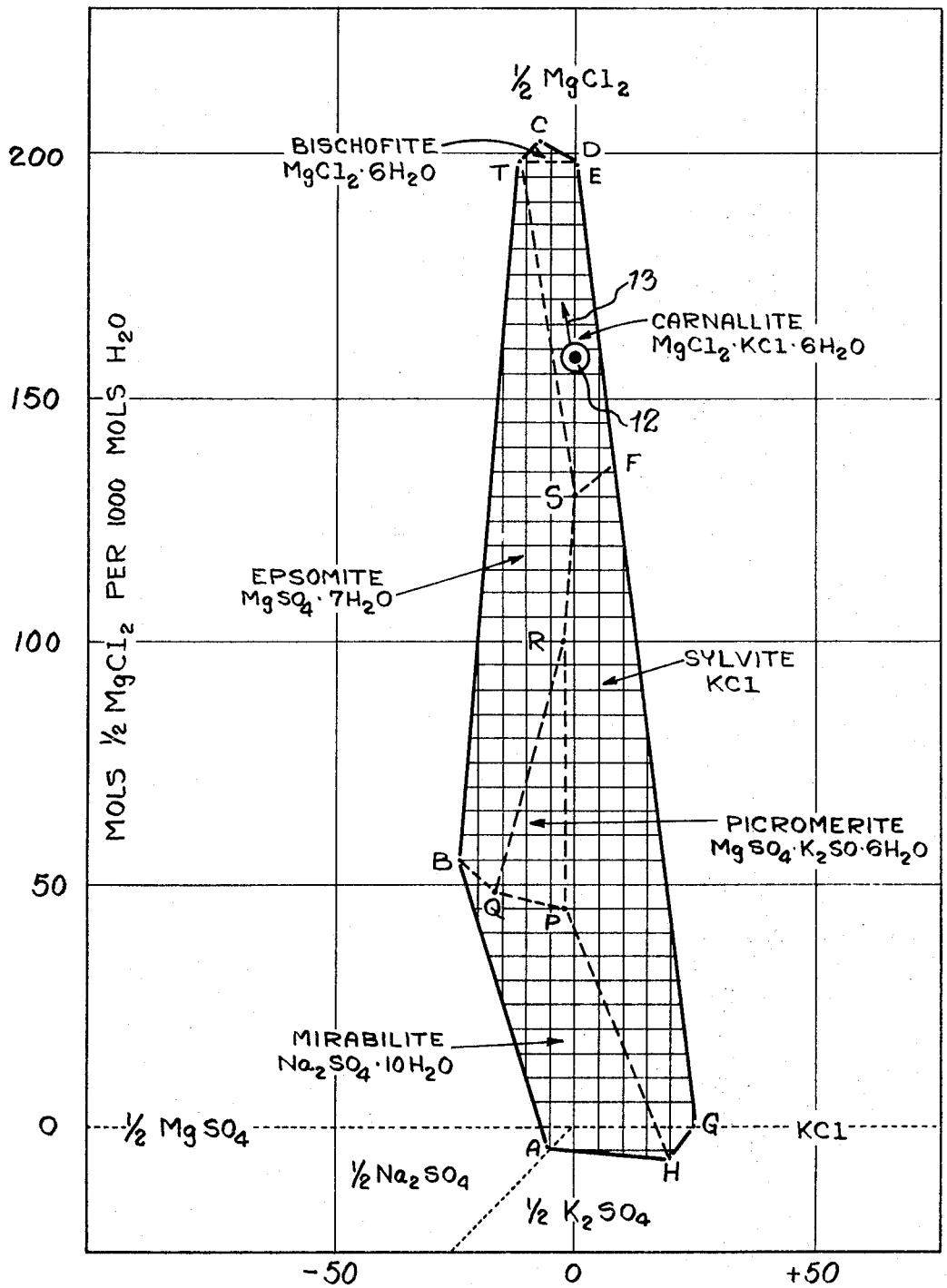
FIG. 2 is a similar diagram at 0° C. Both are in the familiar reciprocal pair form plotting univalent mols per 1,000 mols of water.

Referring to FIG. 1, a brine in equilibrium with kainite and halite (NaCl) is shown plotted at 10, and will precipitate these two salts upon evaporation and drive the composition of the brine in the direction of the arrow 11. If, instead of being evaporated, the brine is cooled, the same two salts are precipitated due to reduced solubility and the brine equilibrium is again shifted as shown by the arrow 11. However, as the temperature is reduced, the kainite field shrinks and the interface between the kainite and carnallite field represented by the line X–U, moves down and to the left and at 12° C. the kainite field is completely eliminated. By the time the cooling has reached 12° C., sufficient kainite has precipitated to drive the brine equilibrium condition completely within the carnallite field, as shown for example at point 12 of FIG. 2. Continued evaporation at this point precipitates a mixture of carnallite and halite, and drives the composition of the brine in the direction of the arrow 13.

Effectively, the transformation of kainite, $MgSO_4 \cdot KCl \cdot 3H_2O$, into carnallite, $MgCl_2 \cdot KCl \cdot 6H_2O$, amounts to the solution of $MgSO_4$, accompanied by an equivalent precipitation of $MgCl_2$. Hence, the resulting mother liquor becomes proportionally higher in $SO_4$ and lower in Cl.

Figure 3:
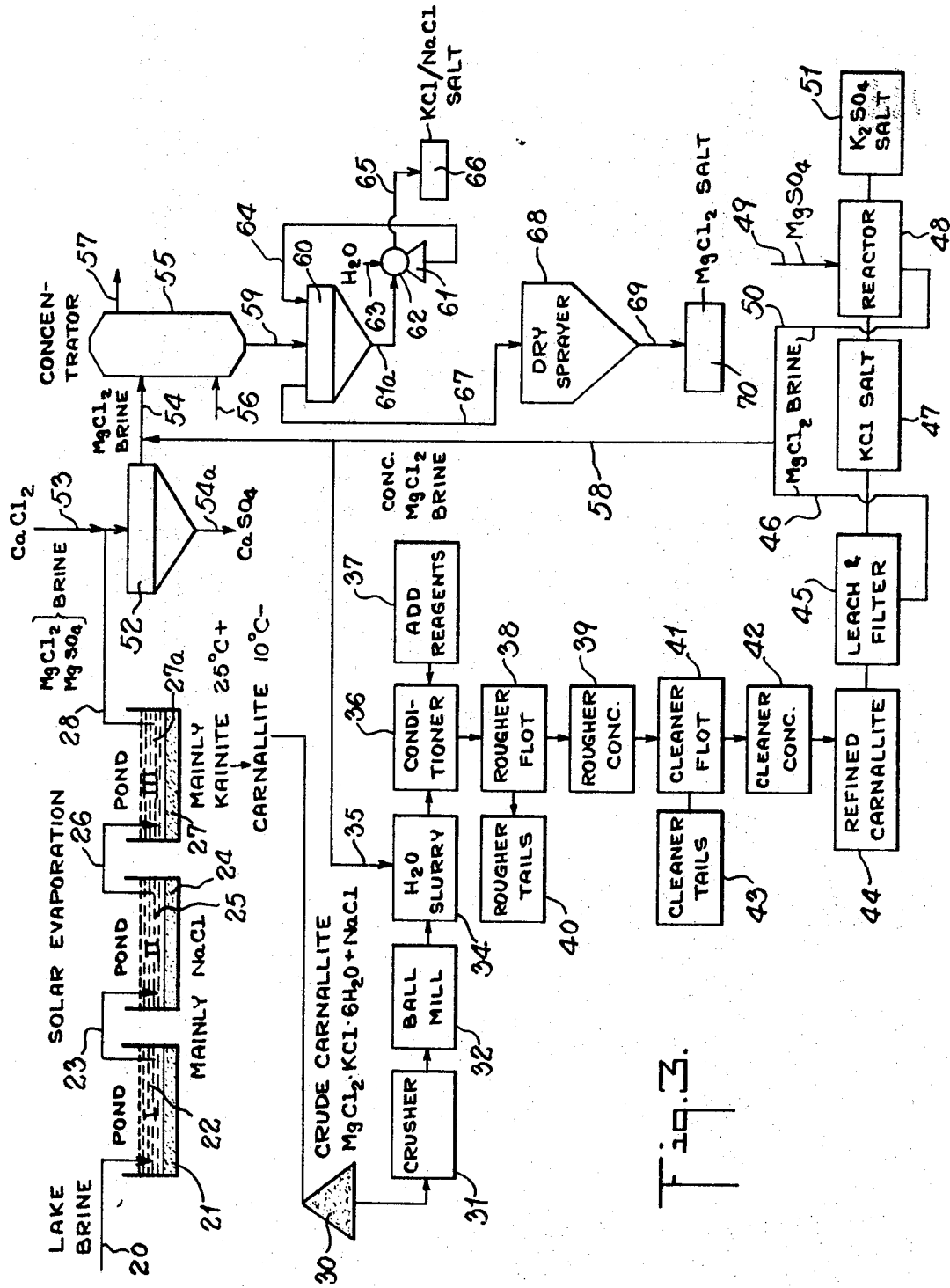

Referring now to FIG. 3 for a description of the basic process of the invention, a brine, such as that from the Great Salt Lake, is fed over a line 20 into a first evaporating pond I wherein it is subjected to solar evaporation until salt precipitation occurs, as at 21, which is mainly NaCl. The mother liquor 22 is withdrawn from pond I over a line 23 and fed into a second evaporating pond II, and evaporated until salt precipitation occurs, as at 24, which again is mainly NaCl. The mother liquor 25 is withdrawn from pond II and fed over a line 26 and into a third pond III and evaporated until salt precipitation occurs, as at 27, which in this case is mainly kainite assuming the evaporation occurs at about 25° C. or higher. The kainite salt is left standing under the supernatant mother liquor 26 and either artificially or by change in ambient temperature, is chilled sufficiently to convert the kainite salt into carnallite as indicated. The mother liquor 27a consisting mainly of $MgCl_2$ and $MgSO_4$ contaminated with NaCl and KCl residues is now withdrawn over line 28 and the crude carnallite salt 27 harvested.

The crude carnallite salt is delivered thence, as at 30, into a crusher 31, thence into a ball mill 32, and into slurry tank 34, wherein the crude carnallite salt is slurried with an aqueous salt solution in equilibrium therewith and supplied via a line 35 as discussed below. The slurry is fed into a conditioner 36, into which add flotation reagents as aforesaid are fed from a source 37.

From the conditioner, the slurry with added flotation reagents is fed into a rougher flotation cell 38, from which the rougher concentrate and tails are delivered as at 39, 40, the rougher concentrate passing into a cleaner flotation cell 41, from which the cleaner concentrate and tails are delivered as at 42, 43. The cleaner concentrate comprising refined carnallite, indicated at 44, is leached with water to dissolve the magnesium chloride values and filtered, as at 45, the $MgCl_2$ brine filtrate being delivered into line 46, and the KCl salt to storage, as at 47. The KCl salt may be converted to $K_2SO_4$ by feeding into reactor 48, supplied with $MgSO_4$, as at 49, to produce $MgCl_2$ brine, discharged over line 50, and $K_2SO_4$ salt delivered to storage, as at 51.

The flotation system 35–42 inc. is refrigerated for maintaining a temperature in the material processed at about 0° C. or under, thus to assure a high recovery of the purified salts and high rejection sodium salts, as shown by test results presented below.

Reverting to pond III, the mother liquor withdrawn therefrom over line 28 and consisting principally of $MgCl_2$ and $MgSO_4$, is fed into a thickener 52, into which calcium chloride solution is also fed via a connecting line 53 for desulfating the mother liquor, with precipitation of calcium sulfate which passes off through the base of the thickener via line 54. The overflow of magnesium chloride brine from the thickener is drawn off over line 54 and fed into the top of a concentrator 55, supplied in counterflow with hot gases via entrance and exit lines 56, 57. The $MgCl_2$ brine fed into lines 46, 50 as described above is fed thence via a connecting line 58, to line 54 and fed thence into the concentrator 55. A portion of this brine is also fed via connecting line 35 to the slurry tank 35.

The hot concentrated $MgCl_2$ brine produced in the concentrator 55 passes by gravity from the base thereof over a line 59 into a cooling tank 60, wherein residual potassium values precipitate as carnallite admixed with common salt. A slurry of this precipitate is drawn off from the base of the tank via drain line 61 and passes into a rotary drum filter 62, washed with water, via line 63, and the $MgCl_2$ brine from which is recycled via line 64 into the cooling tank. The NaCl/KCl salt slurry from the filter is delivered via line 65 into a storage tank 66. From the cooling tank 60, the cool concentrated $MgCl_2$ brine is drawn off via line 67 and delivered into a spray dryer 68, the spray dried $MgCl_2$ powder from which is delivered over line 69 to storage, as at 70, for further processing as desired.

Figure 4:
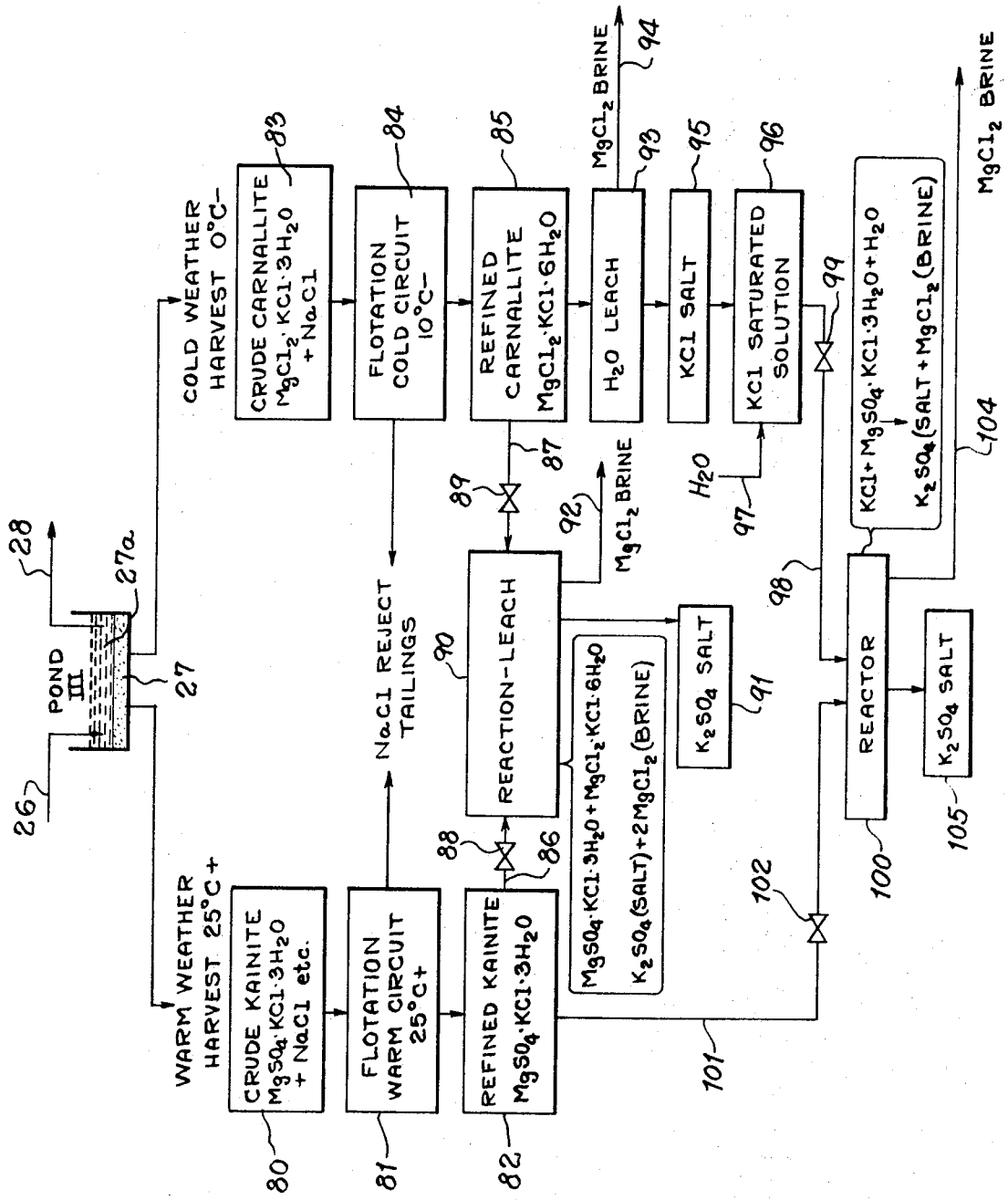
FIG. 4 is a similar flow sheet of the above-mentioned modified embodiment thereof.

Reference will now be had to FIG. 4, comprising a flow sheet of the embodiment of the invention above described wherein a portion of the crude kainite precipitated as at 27 in pond III during warm weather is harvested and stored as at 80, flotation purified in a warm circuit, as at 81, and the refined kainite stored as at 82. The remaining kainite in pond III is left under the mother liquor 27a until cold weather sets in to convert the same to carnallite, and is then harvested and stored as at 83, is flotation purified in a cold circuit, as at 84, and the refined carnallite stored, as at 85.

The refined kainite and carnallite portions may then be fed over lines 86, 87, valved as at 88, 89, into a reaction and leaching vessel 90, for conversion to $K_2SO_4$ salt and $MgCl_2$ in accordance with equation (2) above and as set forth in the flow sheet. The $K_2SO_4$ salt is delivered to storage, as at 91, and the $MgCl_2$ brine is delivered over a line 92, which extends to the concentrator 55 of FIG. 3.

Alternatively, and with further reference to FIG. 4, the refined carnallite salt may be fed from storage at 85, into a leacher 93, for conversion to KCl salt and $MgCl_2$ brine discharged via line 94 which extends to the concentrator 55, FIG. 3. The KCl salt is delivered as at 95 and fed into a slurry tank 96 wherein it is slurried into a concentrated aqueous solution by water introduced, as at 97. The saturated solution is delivered via a line 98, valved as at 99, into a reactor 100. Into the reactor is also fed refined kainite salt from storage at 82 over a line 101, valved as at 102. In the reactor reactions occur as shown in equation (3) above and also on the flow sheet to produce $K_2SO_4$ salt and $MgCl_2$ brine. The brine is discharged into line 104 extending to the concentrator 55, FIG. 3. The $K_2SO_4$ salt is delivered to storage as at 105.

The following examples I and II, tabulate the results of flotation runs made, respectively, on crude kainite salts and crude carnallite salts harvested from pond III.

Example I

Kainite Flotation in Warm Flotation Circuit at About 80° F.

| | | Ion Balance | | |
|---|---|---|---|---|
| | Heads | Cleaner Conc | Cleaner Tails | Rougher Tails |
| Weight | 459.00 | 171.00 | 96.00 | 192.00 |
| Wt. Pct. | 100.00 | 37.25 | | 41.83 |
| Na Pct. | 8.41 | 1.32 | 5.30 | 16.28 |
| Na Wt. | 38.60 | 2.26 | 5.09 | 31.26 |
| Na Dist. % | 100.00 | 5.85 | 13.18 | 80.97 |
| Mg Pct. | 7.43 | 9.09 | 8.22 | 5.55 |
| Mg Wt. | 34.09 | 15.54 | 7.89 | 10.66 |
| Mg Dist. % | 100.00 | 45.60 | 23.15 | 31.26 |
| K Pct. | 8.49 | 12.75 | 10.38 | 3.76 |
| K Wt. | 38.99 | 21.80 | 9.96 | 7.22 |
| K Dist. % | 100.00 | 55.92 | 25.56 | 18.52 |
| $SO_4$ Pct. | 21.34 | 28.08 | 21.34 | 15.33 |
| $SO_4$ Wt. | 97.94 | 48.02 | 20.49 | 29.43 |
| $SO_4$ Dist. % | 100.00 | 49.03 | 20.92 | 30.05 |
| Cl Pct. | 27.66 | 21.05 | 26.87 | 33.95 |
| Cl. Wt. | 126.97 | 36.00 | 25.80 | 65.18 |
| Cl. Dist. % | 100.00 | 28.35 | 20.32 | 51.34 |
| $H_2O$ Pct. | 26.67 | 27.71 | 27.89 | 25.13 |
| $H_2O$ Wt. | 122.41 | 47.38 | 26.77 | 48.25 |
| $H_2O$ Dist. % | 100.00 | 38.71 | 21.87 | 39.42 |
| Pct. Mg Lost in Rougher Tails | | | | 31.26 |
| Pct. K Lost in Rougher Tails | | | | 18.52 |
| Pct. Na Rejected in Rougher Tails | | | | 80.97 |
| Pct. Na Left in Cleaner Conc | | | | 1.32 |
| Pct. Cl Available in Cleaner Conc | | | | 19.91 |

Mineralogy

| Salt Product | X-ray Analysis | Chem. Analysis |
| --- | --- | --- |
| Heads | Kainite, Halite | Halite, Kainite |
| Cleaner Conc | Kainite | Kainite, Halite, Carnallite |
| Cleaner Tails | Kainite, Halite | Kainite, Halite, Carnallite |
| Rougher Tails | Halite, Kainite, Hexahydrite | Halite, Kainite, Hexahydrite |

Example II

Carnallite Flotation in Cold Flotation Circuit at About 34–46° F.

Ion Balance

| | Heads | Cleaner Conc | Cleaner Tails | Rougher Tails |
| --- | --- | --- | --- | --- |
| Weight | 382.00 | 135.00 | 64.00 | 183.00 |
| Wt. Pct. | 100.00 | 35.34 | 16.75 | 47.91 |
| Na Pct. | 3.32 | 0.51 | 2.87 | 5.55 |
| Na Wt. | 12.68 | 0.69 | 1.84 | 10.16 |
| Na Dist. % | 100.00 | 5.43 | 14.48 | 80.09 |
| Mg Pct. | 8.76 | 8.82 | 8.26 | 8.90 |
| Mg Wt. | 33.48 | 11.91 | 5.29 | 16.29 |
| Mg Dist. % | 100.00 | 35.56 | 15.79 | 48.65 |
| K Pct. | 6.80 | 12.45 | 11.31 | .85 |
| K Wt. | 25.60 | 16.81 | 7.24 | 1.56 |
| K Dist. % | 100.00 | 65.65 | 28.27 | 6.08 |
| SO₄ Pct. | 16.10 | 2.82 | 3.01 | 30.47 |
| SO₄ Wt. | 61.49 | 3.81 | 1.93 | 55.76 |
| SO₄ Dist. % | 100.00 | 6.19 | 3.13 | 90.68 |
| Cl Pct. | 24.84 | 35.71 | 36.83 | 12.63 |
| Cl Wt. | 94.89 | 48.21 | 23.57 | 23.11 |
| Cl Dist. % | 100.00 | 50.80 | 24.84 | 24.36 |
| H₂O Pct | 40.27 | 39.69 | 37.72 | 41.60 |
| H₂O Wt. | 153.85 | 53.58 | 24.14 | 76.13 |
| H₂O Dist. % | 100.00 | 34.83 | 15.69 | 49.48 |
| Pct. Mg Lost in Rougher Tails | | | | 48.65 |
| Pct. K Lost in Rougher Tails | | | | 6.08 |
| Pct. Na Rejected in Rougher Tails | | | | 80.09 |
| Pct. Na Left in Cleaner Conc | | | | .51 |
| Pct. Cl Available in Cleaner Conc | | | | 34.92 |

Mineralogy

| Salt | X-Ray Analysis | Chem. Analysis |
| --- | --- | --- |
| Heads | Carnallite, Halite | Carnallite, Hexahydrite, Halite |
| Cleaner Conc | Carnallite | Carnallite |
| Cleaner Tails | Carnallite, Kieserite Halite | Carnallite, Halite |
| Rougher Tails | Halite, Hexahydrite | Halite, Hexahydrite |

As noted in example I the kainite flotation was conducted at room temperature of about 80° F., while as noted in example II the carnallite flotation was conducted at ambient temperature of about 34°–46° F. prevailing during the run.

As further shown in example I, the head salts for the kainite run comprised a mixture of kainite and halite, i.e., kainite crude. The flotation produced refined kainite containing only 1.32 percent sodium by weight by rejecting over 80 percent Na into the rougher tails. The kainite recovery was over 80 percent.

In example II the head salts comprised a mixture of carnallite and halite, i.e., carnallite crude. The flotation produced refined carnallite containing only 0.51 percent sodium by weight by rejecting over 80 percent Na into the rougher tails. The carnallite recovery was over 90 percent.

Reverting to FIG. 4, the kainite concentrate 82 which may be represented by its alternate formula, $MgSO_4 \cdot K_2SO_4 \cdot MgCl_2 \cdot 6H_2O$, may be leached with water to dissolve $MgCl_2$ into a brine leaving schoenite salt $MgSO_4 \cdot K_2SO_4 \cdot 6H_2O$ as a precipitate. The $MgCl_2$ brine may be piped to the concentrator 55, FIG. 3, and the schoenite salt reacted, reverting to FIG. 4, with the saturated KCl solution 96 in reactor 100 to produce $K_2SO_4$ salt and $MgCl_2$ brine according to the reaction.

(4) $$MgSO_4 \cdot K_2SO_4 + 2KCl + H_2O$$
$$\downarrow$$
$$2K_2SO_4 + MgCl_2 + H_2O$$

Still referring to FIG. 4, the kainite and carnallite harvests may be balanced. However, any excess of kainite merely requires chilling to convert to carnallite; while any excess of carnallite merely requires obtaining some $MgSO_4$ to react with KCl values thereof to produce $K_2SO_4$. The equipment requirements are the same whether kainite or carnallite is flotation concentrated, and the basic process is the same in each, i.e., harvest, flotation concentrate and leach.

What is claimed is:

1. The method of purifying crude carnallite salt contaminated with sodium chloride, which comprises: subjecting said crude salt to flotation concentration in the presence of a fatty amine acetate or chloride of at least eight carbon atoms and an aliphatic alcohol of at least five carbon atoms in an aqueous brine in equilibrium therewith and at temperature of about 10° C. and under.

2. The method of recovering potassium and magnesium values from crude kainite salts contaminated with sodium chloride, which comprises: immersing said salts in an aqueous brine in equilibrium therewith and cooling to temperature sufficiently low to convert the kainite to carnallite, subjecting the resulting crude carnallite salt to flotation purification in the presence of a fatty amine acetate or chloride of at least eight carbon atoms and an aliphatic alcohol of at least five carbon atoms in an aqueous brine in equilibrium therewith and at temperature of about 10° C. and under, and washing the carnallite concentrate so obtained with water to produce potassium chloride salt and magnesium chloride brine and separating said salt from said brine.

3. The method according to claim 2 wherein said potassium chloride is reacted with magnesium sulfate to produce potassium sulfate salt and magnesium chloride brine and separating said salt from said brine.

4. The method of processing an aqueous brine containing chloride and sulfate salts of sodium, potassium and magnesium for selectively recovering potassium and magnesium values which comprises: concentrating said brine at substantially room temperature to precipitate predominantly sodium chloride, withdrawing the mother liquor and further concentrating at about 25° C. to precipitate crude kainite salt, cooling said salt in its mother liquor to temperature sufficiently low to convert the kainite values to carnallite, withdrawing the mother liquor and subjecting the resultant crude carnallite salt to flotation concentration in the presence of a fatty amine acetate or chloride of at least eight carbon atoms and an aliphatic alcohol of at least five carbon atoms in an aqueous brine in equilibrium therewith and at temperature of about 10° C. and under, and treating the resultant purified carnallite concentrate with sufficient water to dissolve the magnesium chloride content thereof and retain the potassium chloride content as a precipitate, and separating said precipitate from said magnesium chloride.

5. The method according to claim 4 wherein said potassium chloride is further reacted with magnesium sulfate to produce potassium sulfate salt and magnesium chloride brine and separating said salt from said brine.

6. The method according to claim 2 wherein the mother liquor from said carnallite precipitation is desulfated to produce magnesium chloride brine and combining with that obtained from said carnallite water treatment and evaporating the resultant solution to dryness to produce magnesium chloride powder.

7. The method according to claim 4 wherein an aqueous solution of said potassium chloride is reacted with magnesium sulfate to produce potassium sulfate salt and magnesium chloride brine and separating and wherein said brine is combined with that obtained by desulfation of the mother liquor from said carnallite precipitation, and evaporating the resultant magnesium chloride brine to dryness to produce magnesium chloride powder.

8. The method of processing an aqueous brine-containing chloride and sulfate salts of sodium, potassium and magnesium for selectively recovering potassium and magnesium values, which comprises: concentrating said brine to precipitate predominantly sodium chloride, subjecting the resultant mother liquor to further concentration at substantially room temperature to precipitate crude kainite salt, withdrawing a portion of said crude kainite salt from its mother liquor while retaining the balance therein and cooling to temperature sufficiently low to convert said retained kainite to carnallite, withdrawing the resultant crude carnallite salt and subjecting to flotation concentration in the presence of a fatty amine acetate or chloride of at least eight carbon atoms and an aliphatic alcohol of at least five carbon atoms at temperature of about 10° C. and below, subjecting the withdrawn crude kainite salt to flotation concentration with said above-mentioned fatty amines and aliphatic alcohols has been added after "concentration" at substantially room temperature, and reacting the resultant purified carnallite and kainite concentrates in aqueous medium to form magnesium chloride brine and potassium sulfate salt and separating said salt from said brine.

9. The method according to claim 16 wherein the mother liquor from said carnallite precipitation is desulfated to produce magnesium chloride brine which is combined with that from said carnallite water treatment and the resulting brine evaporated to dryness to produce magnesium chloride powder.

10. The method according to claim 16 wherein the kainite and carnallite salts are separately leached with water to produce magnesium chloride brine and schoenite and potassium chloride salts, respectively, and said salts thereupon reacted in aqueous medium to produce magnesium chloride brine and potassium sulfate salt and separating said salt from said brine.

11. The method of processing an aqueous brine-containing chloride and sulfate salts of sodium, potassium and magnesium for selectively recovering potassium and magnesium values, which comprises: concentrating said brine to precipitate predominantly sodium chloride, subjecting the resultant mother liquor to further concentration at substantially room temperature to precipitate crude kainite salt, withdrawing a portion of said crude kainite salt from its mother liquor while retaining the balance therein and cooling to temperature sufficiently low to convert said retained kainite to carnallite, withdrawing the resultant crude carnallite salt and subjecting to flotation concentration in the presence of a fatty amine acetate or chloride of at least eight carbon atoms and an aliphatic alcohol of at least five carbon atoms at temperature of about 10° C. and below, leaching the concentrated carnallite with water to produce magnesium chloride brine and potassium chloride salt and separating the latter from the brine, subjecting the withdrawn crude kainite salt to flotation concentration with said above-mentioned fatty amines and aliphatic alcohols has been added after "concentration" at substantially room temperature, and reacting the concentrated kainite with the potassium chloride salt in aqueous medium to form magnesium chloride brine and potassium sulfate salt and separating said salt from said brine.